Aug. 16, 1960 A. MAXIM 2,949,308

RECORD PLAYER

Filed June 28, 1955 3 Sheets-Sheet 1

INVENTOR.
Andrew Maxim
BY
Merchant & Merchant
ATTORNEYS

Aug. 16, 1960 A. MAXIM 2,949,308

RECORD PLAYER

Filed June 28, 1955 3 Sheets-Sheet 2

INVENTOR.
Andrew Maxim
BY
Merchant & Merchant
ATTORNEYS

INVENTOR.
Andrew Maxim
BY
Merchant & Merchant
ATTORNEYS 2,949,308

RECORD PLAYER

Andrew Maxim, Cleveland, Ohio, assignor, by mesne assignments, to Imperial Manufacturing Corporation, a corporation of Massachusetts Filed June 28, 1955, Ser. No. 518,586

5 Claims. (Cl. 274—10)

My invention relates generally to devices for reproduction of recorded sound and more specifically to automatic record-changing and playing mechanisms.

Heretofore, in the playing of disc records having selections recorded on their opposite sides, the commonly-used record changers and players of the more simple type are adapted to play only one side of each record in succession until all of the records placed in the device are played. The records are then manually or mechanically removed or inverted after which the opposite sides thereof are played. It is known that mechanisms have been developed which will play both sides successively of a single record prior to the playing of a subsequent record. However, such mechanisms have been very complex and expensive to produce. An important object of my invention is, therefore, the provision of a relatively simple record player mechanism which will automatically play both sides of a single record successively before playing a subsequent record of a plurality thereof.

Another important object of my invention is the provision of an automatic record player which utilizes but a single pick-up arm in the playing of either surface of a record placed in the machine and which eliminates the necessity for a complicated record-turnover mechanism.

Another object of my invention is the provision of a novel mechanism for moving the pick-up or tone arm of my device into operative engagement of the pick-up head thereof with a given surface of a record to be played.

Still another object of my invention is the provision of novel driving means for the record-supporting spindle of my device.

A still further object of my invention is the provision of an automatic record player and changer which is relatively inexpensive to produce, which is highly efficient in operation, and which is rugged in construction and durable in use.

Briefly stated, my invention involves a spindle comprising a pair of axially aligned upper and lower spindle sections each thereof being adapted to support record discs in axially spaced relation to the discs on the other thereof, means for rotating said sections each in an opposite direction from the other, and a pick-up arm having a pick-up head adapted to play in succession the top surface of a record on the lower spindle section and the bottom surface of a record on the upper spindle section.

The above and still further highly important objects and advantages of my invention will become apparent from the following detailed specification, appended claims and attached drawings.

Referring to the drawings, which illustrate the invention, and in which like characters indicate like parts throughout the several views.

Figures 1, 3:
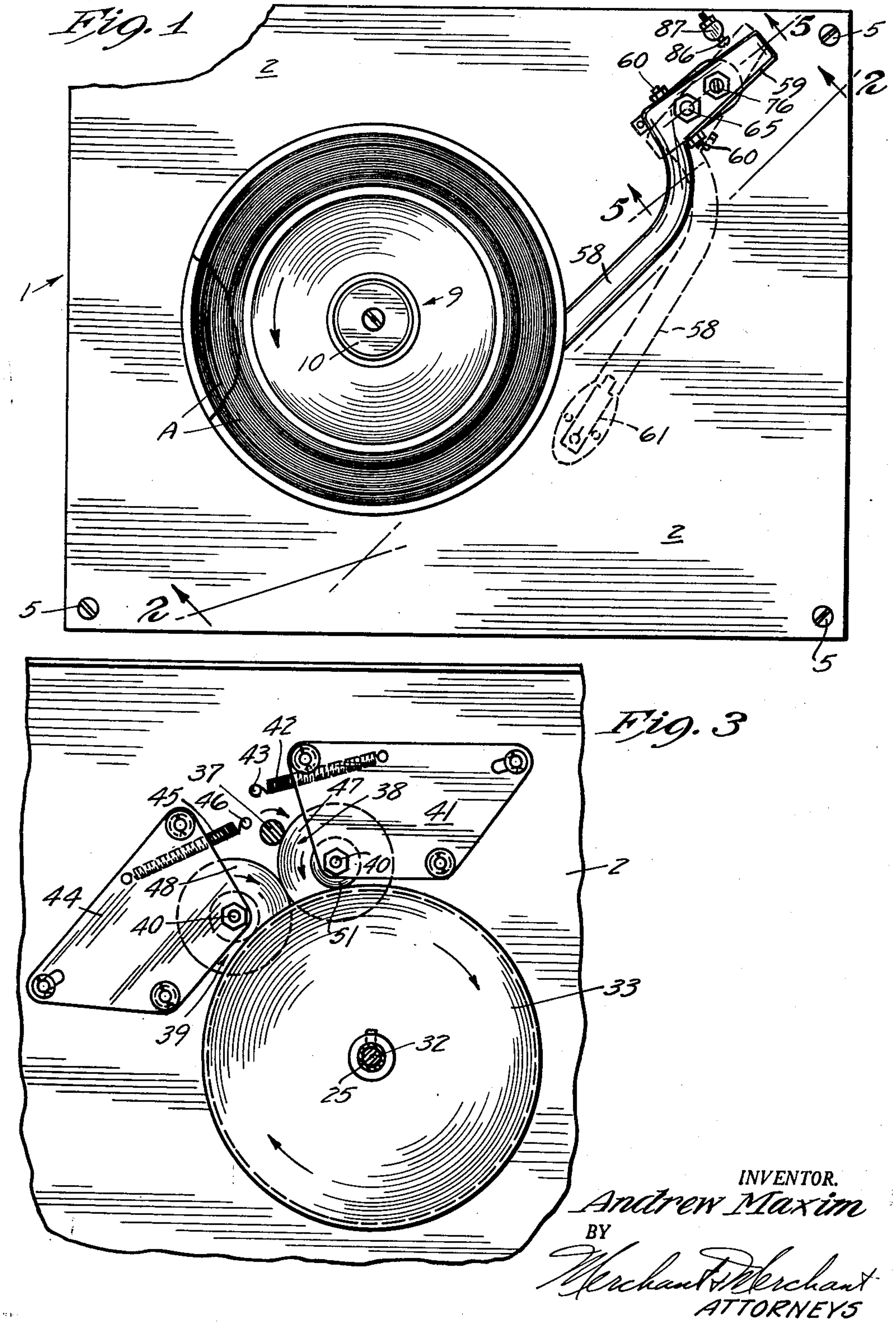
Fig. 1 is a view in plan of a record player built in accordance with my invention, some parts being broken away.
Fig. 3 is a view partly in bottom plan and partly in section taken substantially on the line 3—3 of Fig. 2.

In the preferred embodiment of the invention illustrated, a frame structure, indicated in its entirety by the numeral 1, comprises upper and lower mounting plates 2 and 3 respectively, which are secured in spaced apart relationship by a plurality of tubular spacer bars or rods 4 and nut-equipped bolts 5 extending through the rods 4 and suitable aligned apertures in the plates 2 and 3. The frame structure 1 is adapted to be mounted in a suitable housing not shown. A tubular bearing 6 projects upwardly from the central portion of the upper plate 2, and has a diametrically reduced lower end 7 which is rigidly secured within an opening 8 in the upper mounting plate 2.

Figures 2, 4:
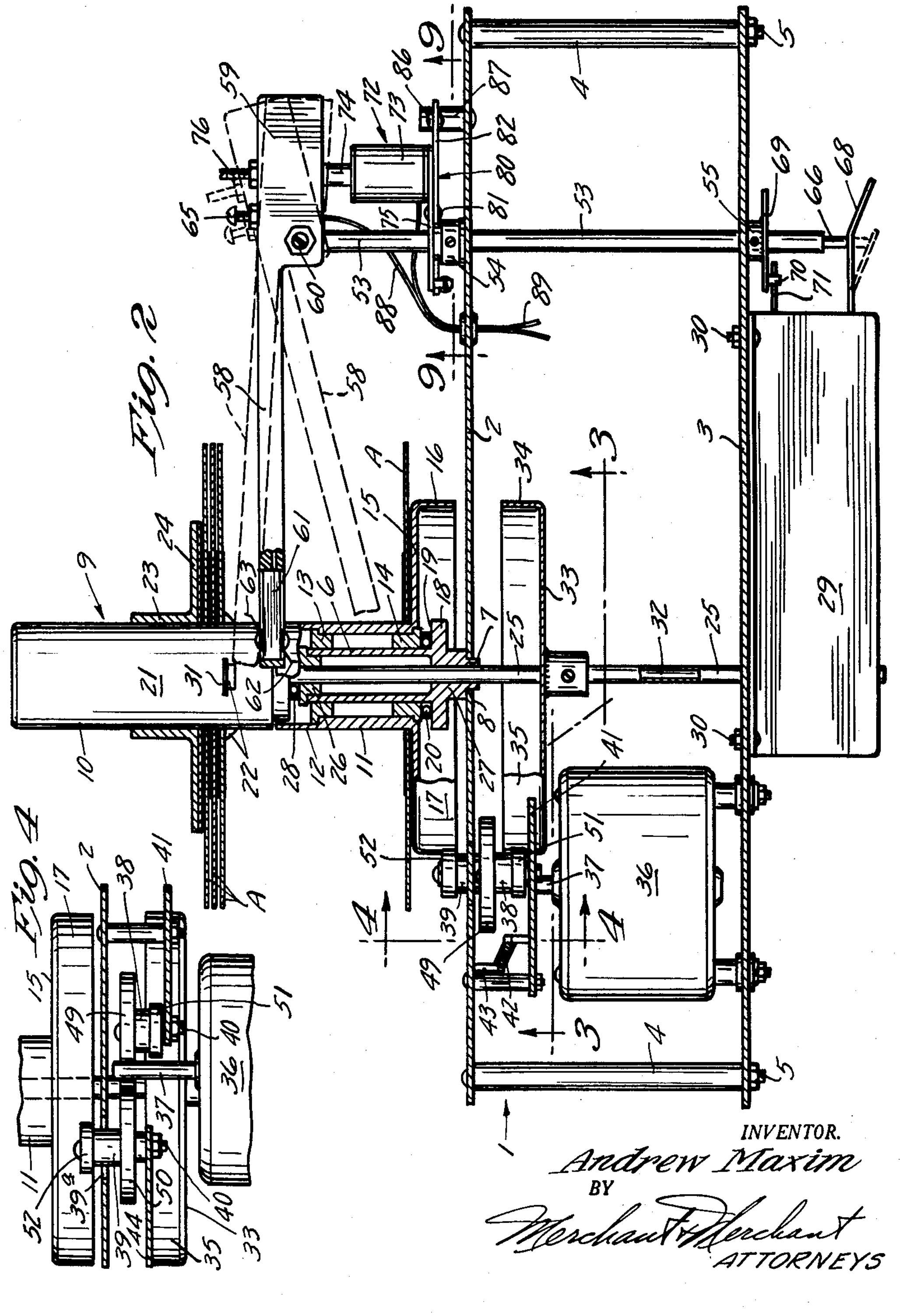
Fig. 2 is an enlarged vertical section taken substantially on the line 2—2 of Fig. 1, some parts being broken away.
Fig. 4 is a fragmentary detail, partly in side elevation and partly in section taken substantially on the line 4—4 of Fig. 2.

Journalled for rotation on the tubular bearing 6 is a record disc-supporting spindle, indicated in its entirety at 9, and comprising axially aligned upper and lower spindle sections 10 and 11 respectively. The lower spindle section 11 includes a vertically extended tubular portion 12 having therein spaced bearing elements 13 and 14 that are journalled on the bearing 6, and a turntable 15 at the lower end of the tubular portion 12, said turntable being formed to provide a depending circumferential flange 16. The outer circumferential surface 17 of the flange 16 provides a drive surface as will hereinafter appear. Adjacent its lower end, and in upwardly spaced relationship to the upper plate 2, the tubular bearing 6 is provided with a diametrically enlarged collar or flange 18 which defines an annular bearing face 19, between which and the lower bearing element or bushing 14 is interposed a thrust bearing 20 preferably of the antifriction type. With reference to Fig. 2, it will be seen that the turntable 15 is adapted to support and turn a conventional record disc A having a central aperture which is slidably received over the tubular portion 12.

The upper spindle section 10 comprises a tubular portion 21 of the same diameter as the tubular portion 12 of the lower spindle section 11, and is provided with a plurality of circumferentially spaced radially outwardly projecting record disc-supporting lugs 22 which are adapted to support record discs A slidably mounted on the upper spindle section 10. A tubular retaining member 23 is provided at its lower end with a radially outwardly projecting circumferential flange 24, and is axially slidably received on the upper spindle section 10, the flange 24 resting on the uppermost record disc A, whereby to act as a stabilizer for the record discs on the upper spindle section as will hereinafter appear. The upper spindle section 10 includes an axially downwardly extending tubular shaft 25 which is journalled in axially spaced upper and lower bearing portions 26 and 27 respectively of the tubular bearing 6. The upper bearing portion 26 and the lower end of the upper spindle section 10 provide opposed races for a thrust bearing 28 interposed therebetween. The bearing 28, like the bearing 20, is of the antifriction type and supports the upper spindle section 10 in axially spaced relation to the lower section 11. As shown in Fig. 2, the tubular shaft 25 extends downwardly through the lower plate 3 of the frame structure 1 into a housing 29 which is secured to the lower plate 3 by means of nut-equipped screws or the like 30. The upper spindle section 10 is provided with a plurality of slicer blades or the like 31, one of which is shown, each of which overlies one of the record-supporting lugs 22. The lugs 22 and slicer blades 31 are movable radially inwardly and outwardly with respect to the tubular member 21 whereby to drop the record discs A from the upper spindle section 10 to the lower spindle section 11 in succession. Means for operating the lugs 22 and slicer blades 31 includes an operating rod 32 which extends axially through the tubular shaft 25, and mechanisms not shown but contained within the tubular member 21 of the upper spindle section 10, and in the housing 29. These mechanisms are well known in the art and may be assumed to be of the type produced by the Radio Corporation of America for use in their well known 45 r.p.m. record players. Inasmuch as these mechanisms do not in themselves comprise the instant invention, detailed showing and description thereof is deemed unnecessary. Hence, for the sake of brevity, such detailed showing and description is omitted. It should be noted however, that, when a record disc A is to be dropped from the upper spindle section 10 to the lower spindle section 11, the slicer blades 31 move radially outwardly from the tubular member 21 whereby to be interposed between the lowermost record disc A on the upper spindle section 10 and the one immediately thereabove. Thereafter, the supporting lugs 22 are retracted sufficiently to permit said lowermost record disc A to drop onto the lower spindle section 11, after which the lugs 22 are projected radially outwardly to their positions of Fig. 2, and the slicer blades 31 are retracted into the tubular member 21. The remaining records A on the spindle section 10, together with the stabilizer member 23, then move downwardly until stopped by the projected lugs 22.

Rigidly secured to the tubular shaft 25 under the upper plate 2 is a rotary member 33 similar to the turntable 15 and having an upturned circumferential flange 34 which defines a circumferentially extended drive surface 35. The turntable 15 and rotary member 33 are driven from a motor 36 rigidly mounted in underlying relation to the upper plate 2 and having an upstanding drive shaft 37. A pair of rotary members in the nature of driving rollers 38 and 39 are journalled each on a different one of a pair of shafts 40. The shaft 40 of the roller 38 is rigidly secured to a plate-like member 41 that is mounted in underlying relationship to the mounting plate 2 for sliding movements toward and away from the rotary member 33, the motor drive shaft 37 and the roller 39, and is yieldingly urged in this direction by a coil tension spring 42 having one end anchored to the plate-like member 41 and its other end anchored to a pin 43 projecting downwardly from the mounting plate 2. The shaft 40 of the driving roller 39 is rigidly secured to a plate-like member 44 that is mounted to the underside of the mounting plate 2 for movements toward the rotary member 15 and the driving roller 38, and is yieldingly urged in this direction by a coil tension spring 45 secured at one end to the plate-like member 44 and at its other end to an anchoring pin 46 projecting downwardly from the mounting plate 2. The driving rollers 38 and 39 are each provided with diametrically enlarged portions 47 and 48 respectively which define respective peripheral surfaces 49 and 50 that are urged into driving engagement with each other by the springs 42 and 45. The spring 42 also serves to maintain the peripheral surface 49 of the driving roller 38 in driving engagement with the motor shaft 37, see particularly Fig. 3. As shown particularly in Figs. 2–4, the driving rollers 38 and 39 are provided with peripheral driving surfaces 51 and 52 respectively, the former of which is disposed below its respective diametrically enlarged portion 47 and in driving engagement with the driving surface 35 of the rotary member 33, and the latter of which is disposed above its respective diametrically enlarged portion 48, and having frictional driving engagement with the driving surface 17 of the turntable 15. It will be noted that the enlarged portions 47 and 48 of the driving rollers are both disposed below the top plate 2, but that the roller driving surface portion 52 is disposed above the level of the upper plate 2. As shown in Fig. 4, the driving roller 39 extends upwardly through an opening 39*a* in the top plate 2. The arrangement is such that the springs 42 and 45, while biasing the driving rollers 38 and 39 into driving engagement with each other, also yieldingly urge the driving surfaces 51 and 52 into driving engagement with their respective rotary members 33 and 15. As shown by arrows in Figs. 1 and 3, the rotary member 33 and upper spindle section 10 driven thereby rotate in a counter clockwise direction with respect to Fig. 1, while the turntable 15 of the lower spindle section 11 rotates in a clockwise direction with respect to Fig. 1. With the spindle sections 10 and 11 thus rotating in opposite directions with respect to each other, a single pick-up arm and head may be utilized to play both sides of the records A as will be described.

Figure 8:
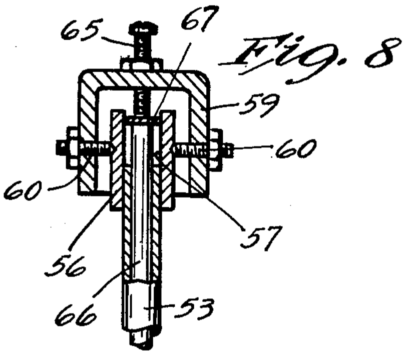
Fig. 8 is a fragmentary vertical section taken substantially on the line 8—8 of Fig. 5.
Figure 10:
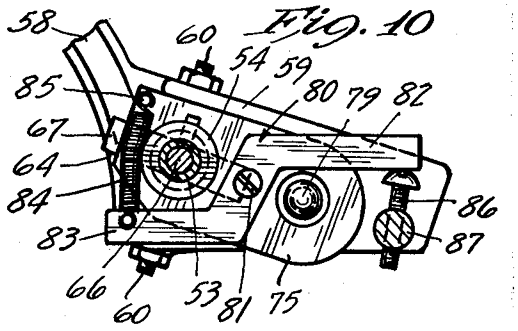
Fig. 10 is a view corresponding to Fig. 9 but showing a different position of some of the parts.

A vertically extended tubular supporting shaft 53 is journalled in the upper and lower plates 2 and 3 in laterally spaced relation to the spindle 9 and is held against axial movement by stop collars 54 and 55 above the upper plate 2 and below the lower plate 3 respectively, see Fig. 2. At its upper end, the tubular supporting shaft 53 is provided with an enlarged tubular head 56 which is bifurcated to provide a transversely extending upwardly opening notch 57. A pick-up arm 58 is provided with an enlarged rear end portion 59 that is pivotally secured by means of pivot pins or the like 60 to the enlarged head 56 of the tubular shaft 53, see particularly Fig. 8. At its free end, the pick-up arm 58 is provided with a conventional pick-up head 61 having a stylus 62 which projects radially outwardly and downwardly from its bottom portion, and a second stylus 63 which projects angularly in a direction radially inwardly and upwardly with respect to the pick-up arm 58, see Fig. 2. The stylus 62 is adapted to engage the top surface of a record disc A mounted on the lower spindle section 11 when the tone arm is moved downwardly from an intermediate position illustrated by full lines in Fig. 2. The angularly upwardly projecting stylus 63 is adapted to operatively engage the under surface of the lowermost record disc A supported by the lugs 22 of the upper spindle section 10 when the pick-up arm 58 is swung upwardly from its normal inoperative full line position of Fig. 2. With the styli 62 and 63 projecting in the directions shown in Fig. 2, and the spindle sections 10 and 11 rotating in the directions above indicated, it should be obvious that record discs which are cut in the usual manner for playing on conventional instruments, may be played on their under surfaces when mounted on the upper spindle section 10 by utililizing the upper stylus 63, and on their top surfaces when moved downwardly to the lower spindle section 11 by utilizing the lower stylus 62. This arrangement also eliminates the necessity of a turnover pick-up head or cartridge. Also as above indicated, the pivot pins 60 permit swinging of the pick-up arm 58 between its normal inoperative full line position of Fig. 2 and the upper and lower operative positions thereof as indicated by dotted lines in Fig. 2, whereas rotation of the tubular supporting shaft 53 permits the pick-up arm 58 to swing about the vertical axis of the shaft 53 between a playing position wherein the styli are in engagement with the playing grooves of the record discs, as indicated by full lines in Fig. 1 and an inoperative position wherein the arm and pick-up head 61 are disposed radially outwardly with respect to the record discs A.

Figure 5:
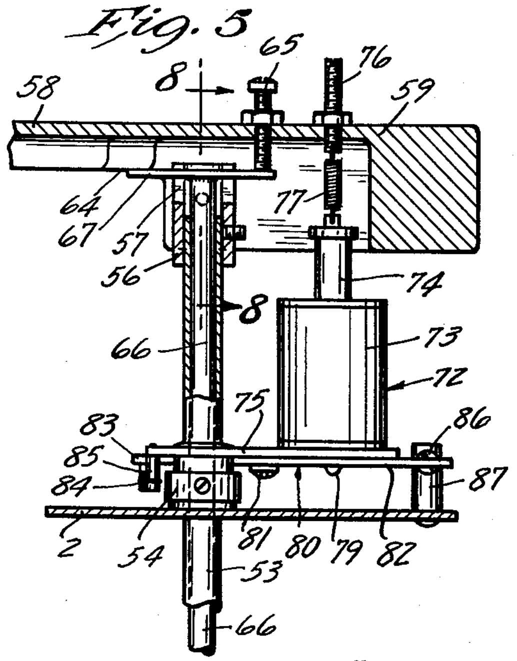
Fig. 5 is an enlarged fragmentary section taken substantially on the line 5—5 of Fig. 1.

The rear pivoted end portion 59 of the pick-up arm 58 is formed to provide an abutment portion 64 in radially outwardly spaced relation to the axis of the tubular supporting shaft 53. An adjustably abutment element in the nature of a lock nut-equipped stop screw 65 is screw threaded in the rear end portion 59 of the tone arm 58 in diametrically opposed relationship to the abutment portion 64. A push rod 66 is axially slidably mounted in the tubular supporting shaft 53, and at its upper end is provided with a crossbar 67 that is contained within the notch 57 of the enlarged head 56. The opposite end portions of the crossbar 67 are adapted to engage the abutment elements 64 and 65 upon axial movement of the push rod 66 in an upward direction whereby to support the pick-up arm 58 in its intermediate full line position of Figs. 2 and 5. Means for moving the push rod 66 in an upward direction includes a cam element 68 which projects laterally outwardly of the housing 29, and which is movable between an operative position indicated by full lines in Fig. 2 wherein it moves the pick-up arm to its intermediate full line position of Fig. 2, and a dotted line position wherein the pick-up arm 58 is permitted to swing downwardly by gravity into operative engagement of the pick-up head 61 with the record disc A on the lower spindle section 11. The particular means for moving the cam element 68 between its above-described positions may be any one of a number of such mechanisms in common use and detailed showing thereof is omitted. Means for imparting rotary movement to the tubular supporting shaft 53 to swing the pick-up arm 58 toward its dotted line position of Fig. 1 to permit movement of a record disc A from the upper spindle section 10 to the lower spindle section 11 includes a flange 69 rigidly secured to the collar 55 and a connection 70 between said flange 69 and an actuator member 71 which projects outwardly from the housing 29 and which may be assumed to be automatically movable in directions to rotate the shaft 53 in the desired directions and to the desired extent. This portion of the mechanism is also well known in the art.

For swinging the pick-up arm 58 upwardly from its intermediate full line position of Fig. 2 and into operative engagement of the stylus 63 with the bottom surface of the lowermost record disc A on the upper spindle section 10, I provide a solenoid 72 comprising a winding 73 and an armature in the nature of a plunger rod 74, the former of which is rigidly secured to a base member 75 rigidly secured to the tubular supporting shaft 53 above the collar 54 thereof. At its upper end, the plunger rod 74 is connected to the rear end portion 59 of the pick-up arm 58 by a lock nut-equipped adjustment screw 76 and a coil tension spring 77 connected at ts lower end to the upper end of the plunger rod 74, and at its upper end to the lower end of the adjustment screw 76. At its lower end, the armature or plunger rod 74 is provided with an annular groove to form a diametrically reduced neck 78, and a downwardly tapering head 79. A latch bar 80 is pivotally secured intermediate its ends, for movements about a vertical axis, to the under side of the base plate 75, as indicated at 81. The latch bar 80 comprises a rearwardly projecting portion 82 which is adapted to engage the reduced neck 78 of the plunger rod 74 to hold the plunger rod 74 against spring biased upward movement with respect to the solenoid winding 73. The latch bar 80 further includes a forwardly projecting portion 83 to the front end of which is anchored one end of a coil tension spring 84, the other end of which is anchored to the base plate 75 as indicated at 85. The spring 84 yieldingly urges the latch bar in a direction of pivotal movement to cause reception of the rearwardly projecting portion 82 in the reduced neck 78 of the plunger rod 74. A latch-releasing abutment element in the nature of a bolt or screw 86 has threaded engagement with a mounting boss 87 which is secured to and projects upwardly from the mounting plate 2.

Energization of the solenoid winding 73 causes the armature or plunger rod 74 to be drawn downwardly sufficiently to cause the latch bar portion 82 to be received in the reduced neck 78 thereof. This downward movement of the plunger rod 74 causes the spring 77 to apply yielding bias to the pick-up arm 58 sufficient to raise the pick-up head 61 into operative engagement with the bottom surface of the record disc A engaging the supporting lugs 22. The latch bar 80 release the plunger rod 74 when the pick-up arm 58 is swung to its dotted line position of Fig. 1 by engagement of the rearwardly projecting portion 32 with the abutment screw 86.

*Operation*

Figure 6:
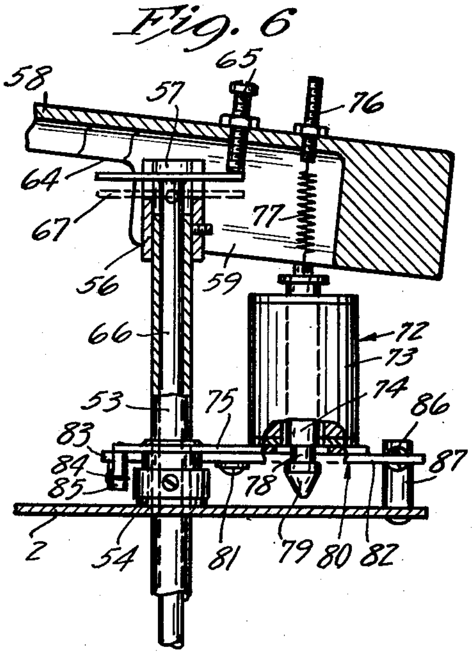
Fig. 6 is a view corresponding to Fig. 5 but showing a different position of some of the parts.
Figure 7:
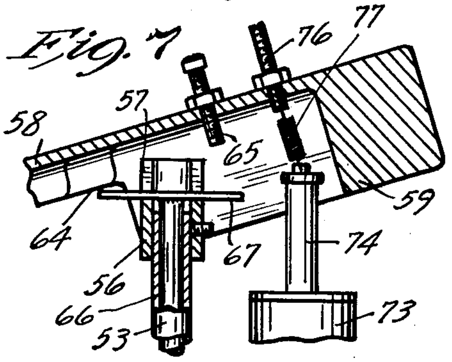
Fig. 7 is a view corresponding to a portion of Figs. 5 and 6 but showing a still different position of some of the parts.
Figure 9:
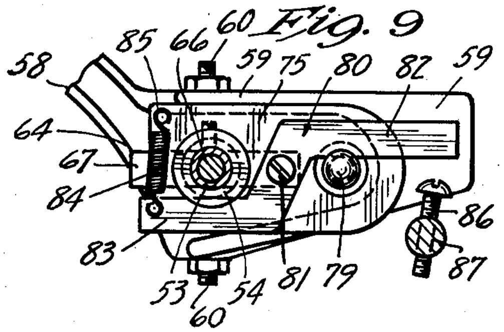
Fig. 9 is an enlarged fragmentary view partly in bottom plan and partly in section, taken substantially on the line 9—9 of Fig. 2.

Assuming that the pick-up head 61 is connected to an amplifier and speaker arrangement by means of a lead or conductor 88, and that the solenoid 72 is interposed in a suitable circuit by means of a lead 89, a desired plurality of record discs A are placed in stacked relationship on the upper spindle 10 with the stabilizer element 23 resting thereon. The motor 36 is then energized by the closing of a suitable switch, not shown, and the mechanism within the housing 29 operates to rotate the tubular shaft 53 in a direction to register the upper stylus 63 with the outermost playing groove on the under side of the bottom record disc A on the upper section 10. The solenoid 72 is then energized to cause the plunger 74 to move downwardly and become latched in its position of Fig. 6 by the latch bar 80, and placing the spring 77 under tension to raise the pick-up arm 58. The cam 68 then moves toward its dotted line position to permit the push rod 66 to drop downwardly under the action of gravity at which time the bias of the springs 77 swings the pick-up arm 58 to its upper playing position. It will be understood that the solenoid 72 is energized for but a brief interval, the latch bar 84 retaining the plunger rod 74 in its lower position shown in Fig. 6. Upon completion of the playing operation, the cam element 68 moves outwardly to its full line position thus moving the push rod 66 to its abutment-engaging upper position of Fig. 5. As the push rod moves upwardly to this position, one end portion of the crossbar 67 engages the abutment element 65 to swing the pick-up arm 58 downwardly to its full line intermediate position of Fig. 2 against bias of the spring 77. The actuator member 71 then rotates the tubular supporting shaft 53 in a direction to move the tone arm outwardly to its dotted line position of Fig. 1 at which point the rearwardly projecting portion 82 of the latch bar 80 engages the abutment screw 86 and is moved thereby in a direction to release the plunger rod 74, whereupon the plunger rod 74 will be pulled upwardly by the spring 77, and the tension thereof, for the most part, will be released. As soon as the pick-up arm 58 is moved to its outer latch-releasing position, the mechanism within the housing 29 will operate to cause retraction of the supporting lugs 22 and radially outward movement of the slicer blades 31 to release the lowermost record disc A on the upper spindle section 10, whereupon the same will drop under the action of gravity to the lower spindle section 11 and come to rest upon the turntable 15. The mechanism within the housing 29 then operates to swing the pick-up arm into register with the outermost playing groove on the top surface of the record which has been dropped to the turntable, and the cam element 68 again moves toward its dotted line position permitting the push rod 66 and pick-up arm 58 to lower, under the action of gravity, into operative engagement of the stylus 62 with the playing grooves of the top surface of the record on the turntable. It will be noted that, during this operation, the solenoid 72 remains de-energized, so that the pick-up arm 58 is free to move to its lower playing position. The arrangement within the housing 29 is such that two playing cycles are required to cause the lugs 22 and slicer blades 31 to operate in a manner to release a record to the lower spindle section 11. Therefore, when the top surface of the record has been played, the mechanism operates to swing the tone arm 58 upwardly and outwardly away from the record disc on the turntable and into playing engagement with the bottom surface of the lowermost record on the upper spindle section 10. The cycle of operation is repeated until all of the record discs have been played on both sides.

My invention has been thoroughly tested and found to be completely satisfactory for the accomplishment of the objectives set forth; and while I have shown and described a preferred embodiment of my novel mechanism, it will be understood that the same is capable of modification, and that modification may be made without departure from the spirit and scope of the invention as defined in the claims.

What I claim is:

1. In an automatic record player for playing both sides of each of a plurality of record discs in succession including a generally horizontally disposed mounting plate, a pick-up head means equipped arm mounted on said mounting plate for swinging movements about a generally horizontal axis between vertically spaced operative record engaging positions and an inoperative position intermediate said operative positions and for swinging movements about a generally vertical axis between said inoperative position intermediate record discs that are disposed in vertically spaced relationship to each other and a second inoperative position radially outwardly of the spaced record discs, and record disc engaging styli extending outwardly from opposite sides of the pick-up head means, the improvement comprising, in combination with the record player of record disc mounting means for rotatably mounting the record discs in the spaced relationship to enable rotation thereof in opposite directions relative to each other, said record disc mounting means including a turntable overlying the mounting plate, a mounting spindle extending axially upwardly from the turntable comprising axially aligned upper and lower spindle sections for supporting the record discs in the spaced relationship, said lower spindle section being connected to the turntable for common rotation therewith and projecting axially upwardly therefrom and terminating intermediate the spaced record discs, a tubular bearing member secured to the mounting plate and extending axially upwardly through the lower spindle section, said tubular bearing member supporting both the upper and lower spindle sections for independent rotation, an elongated axially extending drive shaft concentrically journalled in the bearing member, said drive shaft being connected at the upper end portion thereof to the upper spindle section for common rotation therewith and extending downwardly therefrom through the turntable and mounting plate, a rotary member secured fast to the drive shaft and disposed thereon axially below the mounting plate, said turntable and rotary member each having circumferential drive surfaces, and means for imparting simultaneous rotation to the turntable and lower spindle section in one direction and to the drive shaft and upper spindle section in an opposite direction, said means including a drive motor and a pair of driving rotors, one of said driving rotors being in operative engagement with the drive surface of the turntable and the other driving rotor being in operative engagement with the drive surface of the rotary member.

2. In an automatic record player for playing both sides of each of a plurality of record discs in succession, said record player including, in combination, a generally horizontally disposed mounting plate, a pick-up head means equipped arm mounted on said mounting plate for swinging movements about a generally horizontal axis between vertically spaced operative record engaging positions and an inoperative position intermediate said operative positions and for swinging movements about a generally vertical axis between said inoperative position intermediate record discs that are disposed in vertically spaced relationship to each other and a second inoperative position radially outwardly of the space record discs, record disc engaging styli extending outwardly from opposite sides of the pick-up head means, record disc mounting means for rotatably mounting the record discs in the spaced relationship to enable rotation thereof in opposite directions relative to each other, said record disc mounting means including a turntable overlying the mounting plate, a mounting spindle comprising axially aligned upper and lower spindle sections for supporting the record discs in the spaced relationship, said lower spindle section being connected to the turntable for common rotation therewith and projecting axially upwardly therefrom and terminating intermediate the spaced record discs which are disposed in the spaced relationship, a tubular bearing member supporting the upper and lower spindle sections for independent rotation, said tubular bearing member being secured to the mounting plate and extending axially upwardly therefrom through the lower spindle section, an elongated axially extending drive shaft concentrically journalled in the bearing member and extending therethrough with the upper end portion thereof being connected to the upper spindle section for common rotation therewith and the lower end portion of the drive shaft extending downwardly through the turntable and mounting plate, a rotary member secured fast to the drive shaft adjacent the lower end portion thereof and disposed thereon below the mounting plate, said turntable and rotary member each having circumferential drive surfaces, and means for imparting simultaneous rotation to the turntable and lower spindle section in one direction and to the drive shaft and upper spindle section in an opposite direction, said means including a drive motor having a rotary drive shaft, power transmission mechanism operatively coupling the motor shaft to the drive surfaces of the turntable and rotary member, said power transmission mechanism comprising a pair of driving rotors one each engaging the said drive surfaces of the turntable and rotary member, and mounting means mounting the driving rotors for rotation on generally parallel axes, said driving rotors having interconnecting portions whereby, one of the rotors is caused to rotate in the opposite direction with respect to the rotation of the other rotor.

3. The structure defined in claim 2 in which said driving rotor mounting means comprises a pair of plate-like members one for each of said driving rotors and supported by said mounting plate for movements in directions to move said driving rotors toward engagement with the drive surfaces of the turntable and rotary member and with each other, and in further combination with yielding means independently biasing each of said driving rotors toward said engagement.

4. The structure defined in claim 2 in which said interconnecting portions of the driving rotors comprise annular driving flanges, one of said flanges having direct driving engagement with said motor shaft and with the peripheral surface of the other one of said flanges.

5. In an automatic record player including a mounting plate, a record disc mounting means adapted to rotatably mount record discs is vertically spaced relationship to enable rotation thereof in opposite directions relative to each other, said record disc mounting means including a turntable overlying the mounting plate, a mounting spindle comprising axially aligned upper and lower spindle sections adapted to support record discs in spaced relationship to each other, said lower spindle section being connected to the turntable for common rotation therewith and projecting axially upwardly therefrom and terminating intermediate record discs which are disposed in spaced relationship, a tubular bearing member supporting the upper and lower spindle sections for independent rotation, said tubular bearing member being secured to the mounting plate and extending axially upwardly therefrom through the lower spindle section, an enlongated axially extending drive shaft concentrically journalled within the bearing member and extending therethrough with the upper end portion thereof being connected to the upper spindle section for common rotation therewith and the lower end portion of the drive shaft extending downwardly through the turntable and mounting plate, a rotary member secured fast to the drive shaft adjacent the lower end portion thereof and disposed thereon below the mounting plate, means including said rotary member for imparting simultaneous rotation in one direction to the turntable and lower spindle section and in another direction opposite to the said one direction to the drive shaft and upper spindle section, and a pick-up head means equipped arm having record disc engaging styli extending outwardly from opposite sides of the pick-up head means mounted on said mounting plate for movements between an inoperative position outwardly of the peripheral limits of record discs on said disc mounting means and operative positions intermediate said turntable and record discs carried by said upper spindle section whereby, both sides of each of a plurality of record discs may be played in succession by the record player.

References Cited in the file of this patent

UNITED STATES PATENTS

| | | |
|---|---|---|
| 2,628,843 | Comstock | Feb. 17, 1953 |
| 2,666,648 | Dale | Jan. 19, 1954 |
| 2,683,039 | Fortune | July 6, 1954 |

FOREIGN PATENTS

| | | |
|---|---|---|
| 590,176 | Great Britain | July 10, 1947 |
| 647,416 | Great Britain | Dec. 13, 1950 |
| 822,026 | France | Dec. 18, 1937 |
| 239,044 | Switzerland | Apr. 1, 1946 |